United States Patent [19]
van der Poel

[11] Patent Number: 5,172,345
[45] Date of Patent: Dec. 15, 1992

[54] GEOPHONE SYSTEM

[76] Inventor: Jacobus W. P. van der Poel, Nolensstraat 41B, 3039 PM Rotterdam, Netherlands

[21] Appl. No.: 613,825
[22] PCT Filed: Aug. 10, 1989
[86] PCT No.: PCT/NL89/00063
 § 371 Date: Apr. 10, 1991
 § 102(e) Date: Apr. 10, 1991
[87] PCT Pub. No.: WO90/01712
 PCT Pub. Date: Feb. 22, 1990

[30] Foreign Application Priority Data

Aug. 11, 1988 [NL] Netherlands .................. 8802000

[51] Int. Cl.$^5$ .............................................. H04R 9/00
[52] U.S. Cl. ..................................... 367/178; 367/182; 367/185; 181/122
[58] Field of Search ............... 181/122; 367/182, 185, 367/178

[56] References Cited

U.S. PATENT DOCUMENTS

| | | | |
|---|---|---|---|
| 2,776,560 | 1/1957 | Erath et al. | 367/182 |
| 3,088,062 | 4/1963 | Hudihac. | |
| 3,429,189 | 2/1969 | Krabbe. | |
| 4,051,718 | 10/1977 | Meckl et al. | 367/182 |
| 4,159,464 | 6/1979 | Hall, Jr. | 367/182 |
| 4,412,317 | 10/1983 | Asjes et al. | 367/185 |
| 4,517,514 | 5/1985 | Howell | 367/185 |

FOREIGN PATENT DOCUMENTS 0110431 1/1984 European Pat. Off. .

OTHER PUBLICATIONS

Journal of Physics E Sci. Instrument, vol. 21, No. 8, 1988, Z. Yen et al.: "A High-resolution wideband digital feedback system for seismometers", pp. 748-752.

*Primary Examiner*—J. Woodrow Eldred
*Attorney, Agent, or Firm*—Kenyon & Kenyon

[57] ABSTRACT

A geophone system for measuring mechanical vibrations such as seismic waves include a mechanical transducer with an electronic processing circuit. The mechanical transducer includes an inertial mass adapted to be excited by an input acceleration signal and by a force transducer. The excitation is detected by a sensor element and the processing circuits of the geophones control the force transducer and are connected with a central station via a transmission line.

12 Claims, 7 Drawing Sheets

GEOPHONE SYSTEM

The invention relates to a geophone system for seismic exploration with a plurality of geophones each consisting of a mechanical transducer with an electronic processing circuit, and connected with a central processing station by means of a transmission line.

For measuring seismic signals in such a system, use is made of seismometers or geophones. These geophones are, generally, passive analog sensors connected in series in groups and are connected with a measuring station. By a movement of the geophone, a voltage is induced in a coil which is movably suspended in the magnetic field of a permanent magnet. To achieve a high sensitivity, the mass of the magnet is large, which unfavourably influences the coupling at high frequencies between the geophone and the ground in which it is implanted. The analog connection between the geophones and the measuring station is sensible for disturbances by external electro-magnetic fields.

In the processing station, the analog output signal of the geophones is amplified, sampled and digitized. Because of the high demands put on the resolution, the analog/digital converter and the anti-alias filter required to that end are so sensitive to component tolerances that manufacturing in IC-technology is almost impossible.

Not properly operating geophones can cause much damage to the collected seismic data, which damage will become only apparent during data processing, and recovery thereof is, then, not possible anymore. In order to prevent this, geophones are tested in the field.

From EP-A0264509 (Schlumberger) a system for exploration of bore holes is known comprising transducers in which the position of an inertial mass is detected by optical means, the latter controlling, via an amplifier, the current through the coil of the transducer in question for repositioning the mass in the initial position.

However, the operation of such a transducer is dependent on its orientation in the gravitational field, which, moreover, leads to a wide measurement range. For stability reasons, the loop gain of the processing circuit must be low. Such a system is already not very suitable for seismic exploration in the field, but the small loop gain makes it impossible to digitalize such a system as, then, a high loop gain is required for suppressing the quantization noise. Digitalization is very favorable in view of suppression of signal disturbances in the line or lines toward the central data processing station and also has other advantages as to the data processing and the grouping of the various sensors in the overall system.

From an article by Z. Yin and M. J. Usher entitled "A High Resolution Wide Band Digital Feedback System for Seismometers", J.Phys. E. Sci. Instr. 21 (1988) 748–752, an acceleration transducer with a digital output is known. This transducer uses a capacitive sensor to detect the displacement of an inertial mass, an analog/digital converter to produce a digital signal, and a magnetic coil force-feedback transducer controlled by a digital/analog converter. By changing the parameters in a computer program, gain ranging and variation of the bandwidth can be achieved. To prevent instability of the transducer system, pole-zero cancellation is used. Pole-zero requires high component accuracy, and is not suitable for a system with a high loop gain and a large bandwidth which is to manufactured in IC-Technology. The reduction of quantization noise in this system is therefor comparatively small. Moreover this known system is not intended for seismic exploration in the field by means of a plurality of distributed sensors, but is intended for seismological surveys relating to earthquakes and similar geological phenomena, and this system comprises only one sensor in a laboratory setup which is directly connected with a data processing device.

From U.S. Pat. No. 3,429,189 (H. F. Krabbe) an accelerometer is known producing a digital output signal. The sensor assembly consists of a sensor element determining the position of an inertial mass and a drive coil exerting a repositioning force on the inertial mass. When the output value of the position sensing element exceeds a positive or negative value, a current pulse is sent through the drive coil. A Lorentz force is exerted thereby on the inertial mass, which is opposite to the force caused by the acceleration to be measured. The movement of the inertial mass will be reduced to substantial zero by the repositioning force. Since the duration of the current pulse is short and constant, the sum of the current pulses is proportional to the average Lorentz force and, thus, to the acceleration. By means of a digital counter the acceleration can be computed. The velocity of the mechanical input signal to be measured is proportional to the frequency of the output signal. In fact a sensor having a frequency output is obtained in this manner.

This accelerometer is not suitable for seismic exploration. To achieve a large dynamic range, the closed-loop gain should be chosen very large, but then the damping of the sensor assembly would be strongly reduced, and instability would occur.

This known accelerometer can, furthermore, only be tested by means of a mechanical input signal, which, in view of the large number of implanted geophones, will be objectionable.

From NL-A8202309, a geophone is known using a coil as a sensing element to detect the movement of an inertial mass, and a second coil to control a force transducer. The mutual inductance of the two coils limits the loop gain. The mechanical construction is complex, because it is necessary to magnetize the magnets before they are glued to an H-shaped pole piece which can only be done in a clean room. Furthermore, mechanical tolerances of the H-shaped pole-piece are difficult to meet. This sensor does not provide a digital output signal, nor does it use a digital signal as a test signal.

U.S. Pat. No. 3,088,062 to Hudimac shows a measuring instrument for a sonar system in which the movement of an inertial mass is attenuated by the Lorentz force generated by a current flowing through two coils in series which are connected with a negative impedance so that the current in the latter represents the movement. Since the magnetic flux variation in the coils is caused by an air-gap variation, the linearity is too restricted for use in seismic exploration.

It is an object of the invention to provide a digital geophone not having these disadvantages. This geophone is described in claim 1 in more detail, and has the following properties: because of the digital communication, the influence of disturbances on the cable will be small, and a large distance between the geophone and the measuring station is possible; the analog/digital converter and the anti-alias filter are so insensitive for component tolerances that realization thereof with IC-technology is possible, so that the analog/digital converter and the anti-alias filter can be included in the geophone; the band-width of the geophone is large, and is determined by a digital filter, which leads to a large degree of freedom; the inertial mass is small, so that the geophone has a small mass as well as a small volume, ensuring a good ground coupling; on the basis of the small deviation of the inertial mass, use can be made of springs with a large transversal stiffness; the geophone is usable in any position, and is only sensible for an axial vibration; by means of a digital test signal, the transfer and distortion of the geophone can be measured.

The invention will be described below in more detail with reference to the drawing; showing in.

Figure 1:
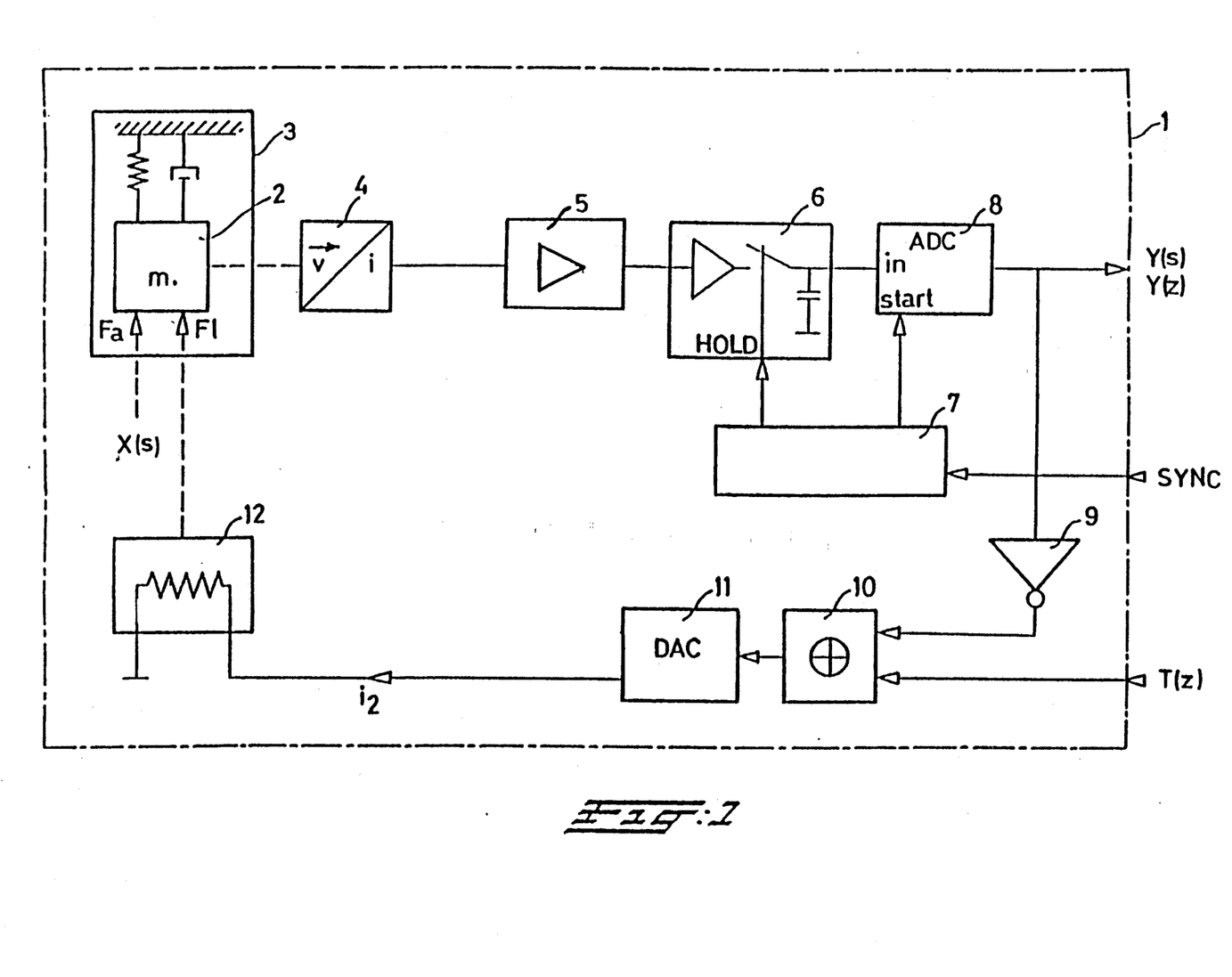
FIG. 1 a circuit diagram of the digital geophone according to the invention.

FIG. 1 shows a circuit diagram of the digital geophone according to the invention. The mechanical signals are shown by dotted lines, and the electrical signals by drawn lines. The geophone undergoes an input acceleration X(s), causing a force Fa to act on the inertial mass 2. If the resulting force of this force Fa and the Lorentz force Fl to be elucidated below is not equal to zero, this will have as a consequence a movement of the inertial mass 2 of the mass-spring system 3, which is detected by the velocity sensor 4. The operation of the velocity sensor 4 will be elucidated in more detail by FIGS. 5 and 6. From a physical point of view, the sensor element 4 has an output voltage, but in view of the realization thereof with IC-technology, this voltage is converted into an output current by the analog input amplifying stage. The amplifying stage of the sensor element 4 is amplified by the amplifier 5. The signal is sampled by the sampling element 6 after the command "HOLD" of a clock 7. The clock 7 is controlled by an external synchronisation signal "SYNC". The sampled signal is converted by the analog/digital converter 8 into a digital signal after the command "START" of the clock 7. The sampling frequency fs is high, and, at any rate, much higher than the resonance frequency of the mass-spring system 3. Because of the limited resolution of the analog/digital converter 8, the latter can be realized in an IC-process. The digital output signal Y(z) is inverted by an inverter 9, so that the signal in the feed-back circuit is in phase opposition to the input signal. A digital adder 10 adds a test signal T(z) to the inverted output signal. During measurement the signal T(z) is equal to zero. Testing the sensor assembly 1 will be elucidated in more detail by reference to FIG. 7. The sum signal of the adder 10 is converted by the digital-/analog converter 11 into a current i2. A force transducer 12 exerts a Lorentz force Fl on the inertial mass 2 which is proportional to the current i2. Because of the Lorentz force, the movement of the inertial mass 2 will be substantially reduced to zero.

For using the geophones for seismic measurements, it is necessary that the geophone can be tested. The transfer function of the digital geophone can be tested by means of the test signal T(z). By means of the digital adder 10, the test signal is added with the inverted output signal, and, by the digital/analog converter 11, a current i2 is sent through the force transducer 12. The inertial mass 2 is excited in the same manner as by the input acceleration signal. The transfer function Y(z)/T(z) is, in the seismic band width, almost equal to the transfer function Y(z)/X(z), apart from a frequency independent factor. For using the test device, it is necessary that the output signal and the test signal are being synchronized. Therefore, the "START" command will be generated by the clock by means of the external synchronization signal.

In order to reduce the number of wires, use can be made of serial communication between the geophones and the measuring station. There is, then, a common data line connecting the output signals of a group of geophones with the measuring station, and a control signal controlling the serial communication. The control signal makes use of a coding device and a specific code with which each geophone is provided. The test signal and the synchronization signal can be accommodated in the control signal by means of specific bit combinations. Such a communication system is known, and will, therefore, not be elucidated in more detail.

Figure 2:
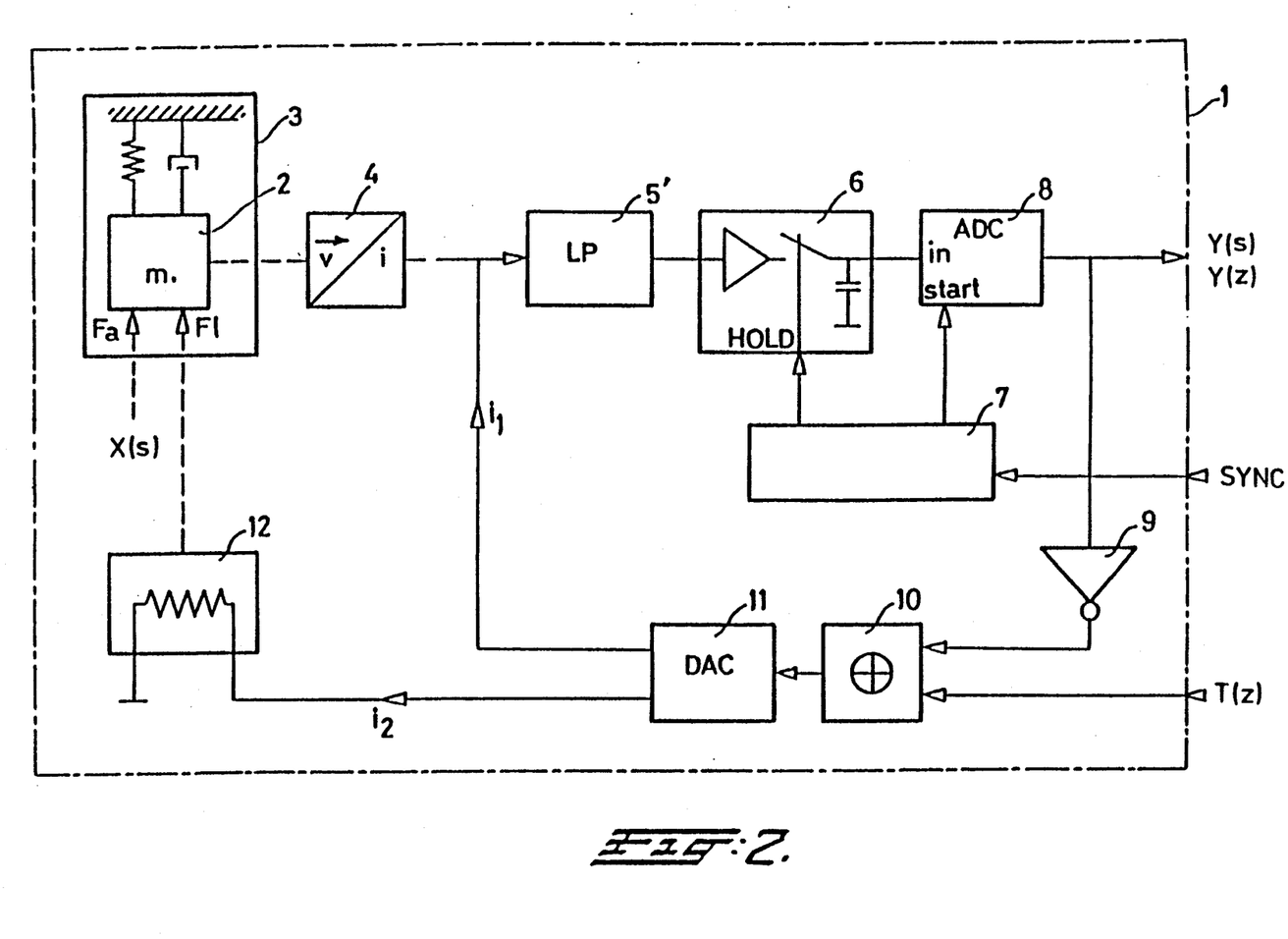
FIG. 2 a circuit diagram of the digital geophone, in which, by means of a second feed-back loop, an improved noise suppression is obtained.

FIG. 2 shows an alternative circuit diagram of the digital geophone. The output current of the velocity sensing element 4 is, now, added with a current i1 to be discussed below, and is amplified by the amplifier 5'. The amplifier 5' has a very high gain factor and a low-pass transfer characteristic. The cut-off point of the frequency characteristic is very low, so that the input signal is integrated. The output signal of the low-pass filter 5' is sampled by the sampling element 6 after the command "HOLD". The analog/digital converter 8 converts the voltage into a digital output signal Y(z), and after inversion by the inverter 9 the output signal Y(z) is added to the test signal T(z). The obtained sum signal is converted, by the digital/analog converter 11, into two output currents i1 and i2. The current i1 is added to the output current of the velocity sensing element 4, and is integrated by the low-passfilter 5'. The force transducer 12 exerts a Lorentz force Fl on the inertial mass 2 which is proportional to the current i2.

The gain factors of the low-pass filter 5' should be high. The feed-back in the sensor assembly 1 for a signal with a frequency zero is interrupted, since the velocity sensor 4 can only detect a movement of the inertial mass 2. The offset voltage of the low-pass filter 5' appears with a very high gain factor at the output, and, thus, limits the dynamic range of the sensor. In IC-technology, an offset compensation can be difficultly realized, and is, therefore, expensive. By providing a second feed-back circuit with the current i1, this disadvantage is restricted. The offset of the low-pass filter 5' is reset back by i1, and the gain factor of the low-pass filter 5 can, now, be chosen very high without the offset restricting the dynamic range. By means of the second feedback circuit, moreover a better suppression of the quantization noise will be obtained. This will be elucidated in more detail below.

The digital/analog converter 11 with two output currents can be realized in IC-technology by means of a current mirror with a multiple output.

Figure 3:
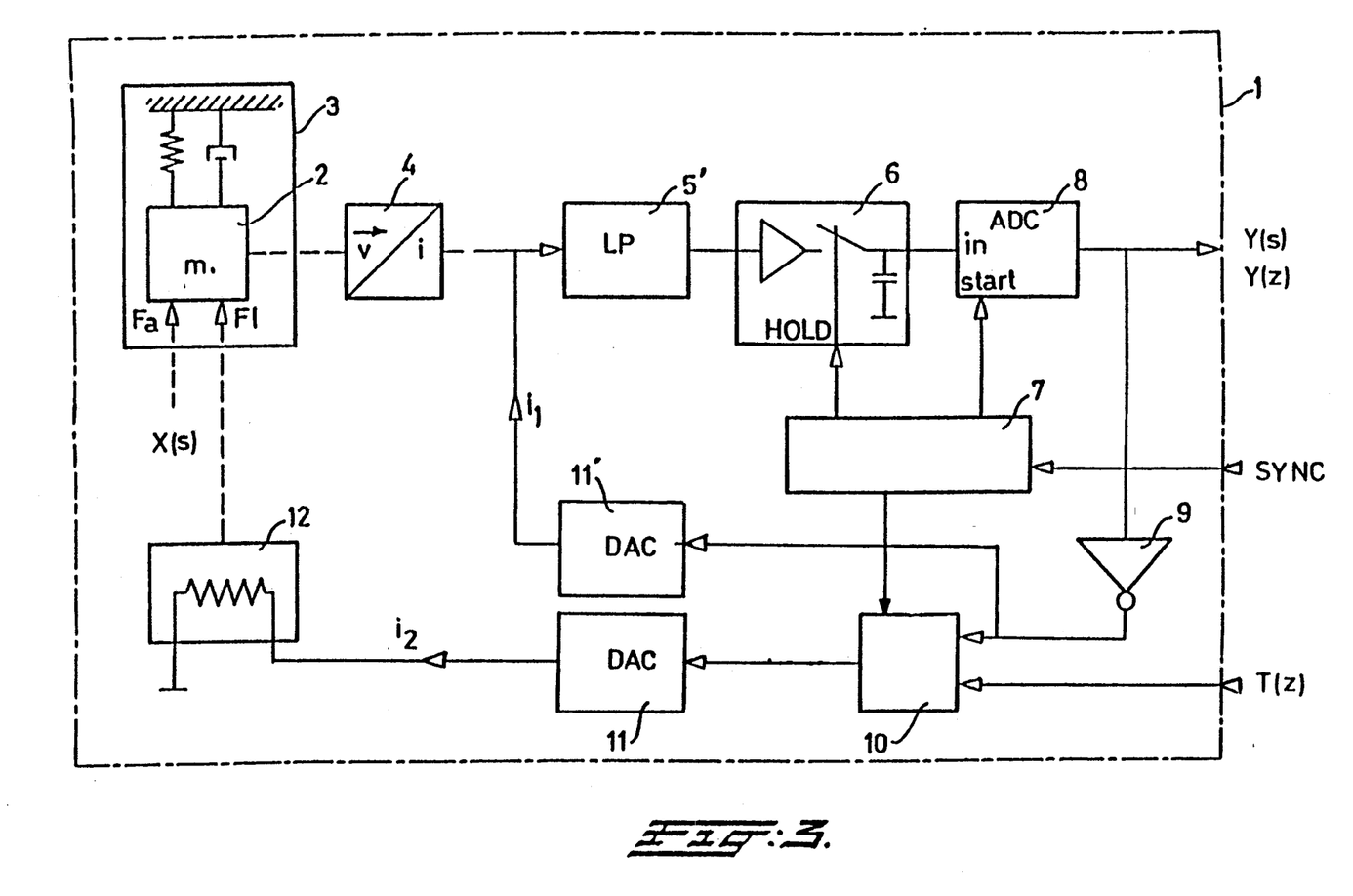
FIG. 3 a circuit diagram of the digital geophone in which a higher sampling rate is possible.

FIG. 3 shows an alternative circuit diagram. In this diagram, the currents i1 and i2 are generated by means of two separate digital/analog converters 11 and 11'. By means of the device according to this circuit diagram, the sampling rate, by means of which the digital word is converted into a current i1, can be chosen much higher than the sampling frequency generating the current i2. The advantage thereof is that the sampling rate is not limited by the maximum frequency of the current i2, the voltage across the drive coil 12 then being lower than the supply voltage. By chosing a very high sampling rate for the analog/digital converter 8 and the digital/analog converter 11', components having a lower resolution can be used therefor. An arithmetical unit 10' adds, now, the inverted output signal Y(z) to the test signal T(z), integrates the sum signal, and sends, after a clock pulse of the circuit 7, the signal towards the digital/analog converter 11. The integration of the sum signal obtained by the low-pass characteristic of the arithmetical circuit 10' improves the resolution of the signal fed back.

Figure 4:
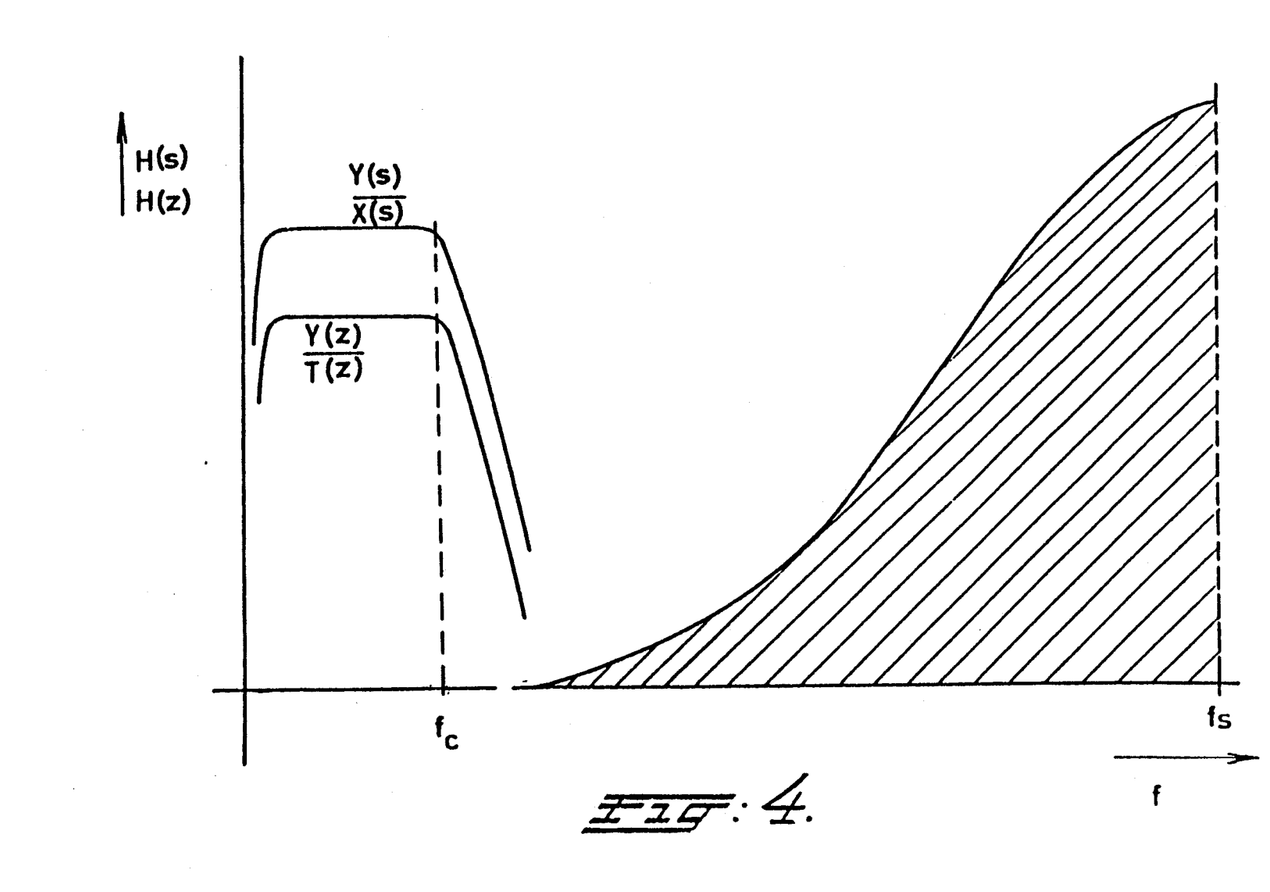
FIG. 4 the frequency characteristic of the input signal and the test signal; also the influence of the quantization noise is visible.

FIG. 4 shows the frequency characteristic of the sensor assembly. The mass-spring system 3 has a resonance frequency lying within the seismic band-width, but because of the high open-loop gain, the transfer of the sensor assembly 1 within the seismic band-width will be hardly influenced by the frequency characteristic of the mass-spring system 3. For frequencies higher than the seismic band-width, the open-loop gain is small because of the low transfer function of the mass-spring system 3 and the low-pass filter 5'. The transfer function Y(s)/X(s) of the sensor assembly 1 will then decrease with an increase of the frequency. Since the velocity sensing element 4 will only detect the movement of the inertial mass 2, the transfer function of the sensor assembly 1 will be low at frequencies lower than the seismic band-width.

The resolution of the analog/digital converter 8 is low, and quantization noise is added to the output signal. This quantization noise is uniformly distributed over the frequency band, but, because of the high open-loop gain at low frequencies, the contribution of the quantization noise to the output signal will be small. At higher frequencies the open-loop gain will decrease, and the quantization noise is no longer suppressed. In FIG. 4 the contribution of the quantization noise in the output signal is represented by a hatched area. From this Figure it appears that the contribution of the quantization noise in the seismic band-width (up to the frequency fc) will be strongly suppressed. By selecting a very high sampling rate or by using a multiple feed-back loop, a maximum suppression of the quantization noise is obtained.

By means of a digital low-pass filter, frequencies above the frequency fc can be suppressed. As a consequence of using the digital filter, the signal/noise ratio increases, and the resolution of the digital output signal is improved. It is possible to combine the digital filter of several geophones belonging to a group by adding the geophone data. By resampling the digital signal after the low-pass filter, the capacity of the data communication channel and the data storage will be used more efficiently. If the filter is made by VLSI, the filter can be accommodated inside the geophone. This technology is known per se, and will, therefore, not be elucidated in more detail.

Figure 5:
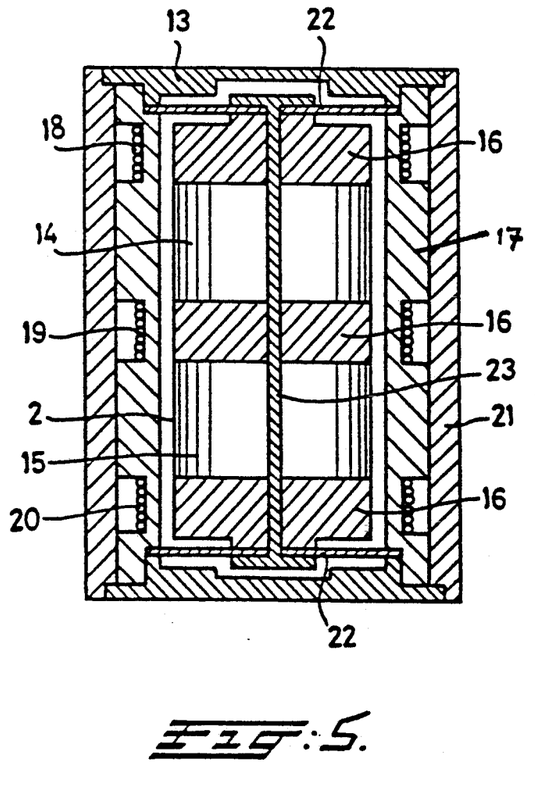
FIG. 5 the mechanical transducer used in the geophone.

FIG. 5 shows the mechanical transducer 13. This transducer 13 consists of an inertial mass 2 comprising a magnet 14, a distance piece 15 and inner pole pieces 16, as well as a housing 17 with a sensing coil 18, a driving coil 19, a compensation coil 20 and a tubular pole shoe 21. The inertial mass 2 is suspended in the housing 17 by means of springs 22. A movement of the inertial mass 2 changes the magnetic flux within the sensing coil 18, and, then, induces a voltage. The sensing coil 18 is in series with the compensation coil 20, and is connected with the input of the electronic processing device. Since the magnetic field generated by the magnet 14 is null in the airgap of the compensation coil 21, a movement of the inertial mass 2 will not induce a voltage in the compensation coil 21. The drive coil 19 is connected to the electronic processing device, and is situated in the magnetic field of the magnet 14. If a current is sent through the drive coil 19, the Lorentz force $Fl = B.i.1$ will exert a force on the inertial mass 2. Since the magnetic flux density B and the coil length 1 are constant, the Lorentz force Fl is proportional to the current i. The current through the drive coil 19 has, moreover, as a consequence that by mutual induction between the drive coil 19 and the sensing coil 18 an induction voltage is induced. In order to prevent that the electronic processing device would recognize this induction voltage as a movement of the inertial mass 2, the compensation coil 20 is provided. Since the relative permeability value of the distance piece 15 is equal to that of the magnet 14, i.e. that of air, the induced voltage in the compensation coil 20 will be equal to the induction voltage in the sensing coil 18. The winding sense of both coils is, however, opposite, so that by a series connection of both coils the induction voltage as a consequence of a current through the drive coil 19 will be null.

Between these coils a capacitive coupling might arise. In order to prevent this the inner pole shoes 16 are connected, by means of a core 23, with one another and with the electric mass of the electronic processing device. The material of the core 23 is electrically conductive but magnetically non-conductive, and is, for instance, made of copper. The core 23 also serves for mechanically mounting the pole shoes 16, the magnet 14 and the distance piece 15 to the springs 22. A mechanical connection by means of glueing is possible, but, in view of the shock resistance, not attractive.

Figure 6:
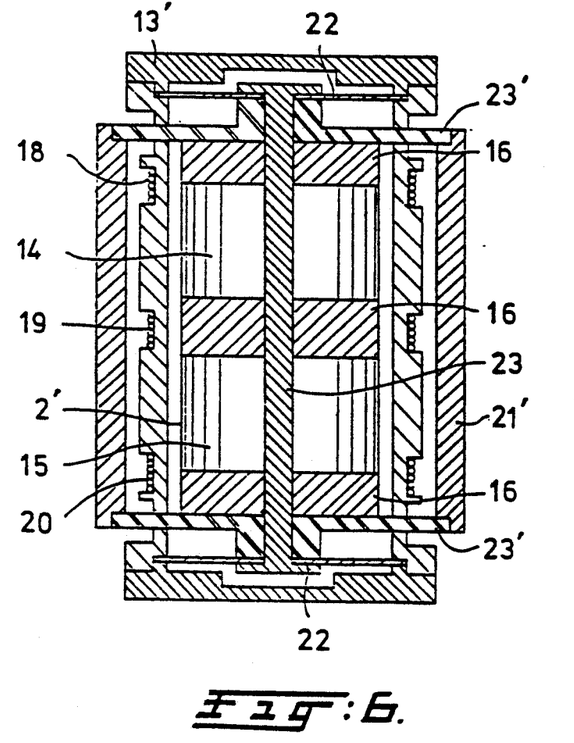
FIG. 6 a mechanical transducer which may be used for the geophone, in which the centering forces on the inertial mass are absorbed by a rigid construction.

The mechanical construction according to FIG. 5 is simple, but has the disadvantage that the outer pole shoe 21 made of a material conducting the magnetic field is attracted by the inner pole shoes 16 and the magnet 14. The springs should, therefore, be sufficiently rigid in the radial direction for creating a centering force which is sufficient for compensating the attraction force of the magnet 14. In FIG. 6 a mechanical transducer 13' is shown which does not have this disadvantage. The inertial mass 2' is, now, formed by the magnet 14, a distance piece 15, inner pole shoes 16 and an outer pole shoe 21'. The housing 17 comprises the sensing coil 18, the drive coil 19 and the compensation coil 20. The outer pole shoe 21' is rigidly fixed to the outer side of the inner pole shoes 16 by means of spokes 23'. The magnetic attraction force between the inner pole shoes 16, the magnet 14 and the outer pole shoe 21' is now absorbed by the rigid mechanical connection. The inertial mass 2' is suspended in the housing 17 by means of the springs 22.

Figure 7:
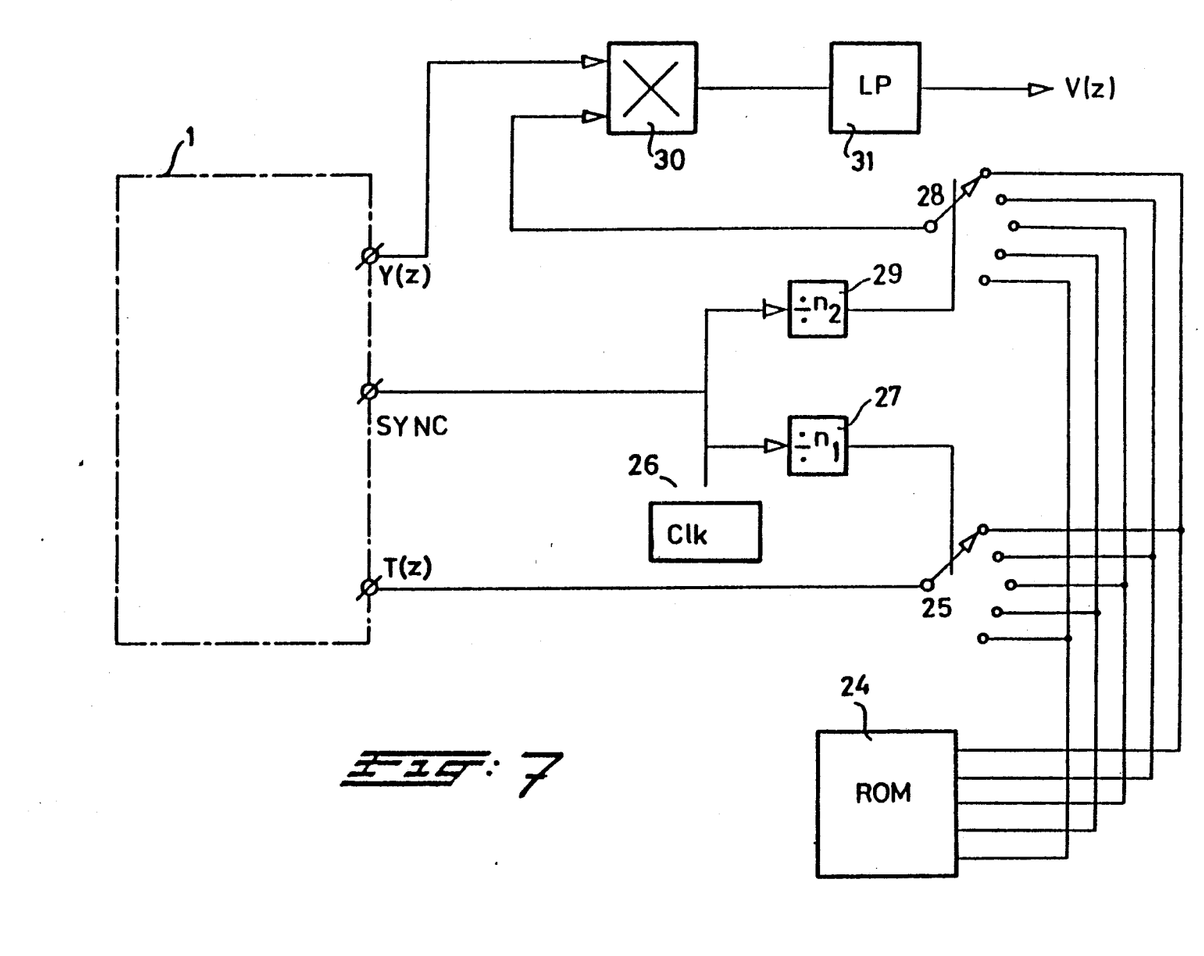
FIG. 7 a circuit element of the circuit, by means of which the geophone can be tested; this circuit measures, to that end, the harmonic distortion.

FIG. 7 elucidates a method for measuring the distortion level of the sensor 1. A read-only memory 24 contains a digitized sine signal. A switch 25 reads the read-only memory, and produces the test signal T(z). The period of the test signal T(z) is determined by the clock frequency generated by the clock generator 26 and a counter 27. The frequency of the test signal can be varied by adjusting n1. The test signal T(z) excites the inertial mass 2, and simulates an acceleration input signal X(s). The output signal Y(z) contains the response of the test signal T(z) and the acceleration signal X(s).

At the same time a second switch 28 reads the read-only memory 24 with a period determined by the clock generator 26 and a counter 29. This test signal is generated with a frequency which is $n_2/n_1$ times higher than the frequency of the first test signal. This signal is multiplied with the output signal of the sensor 1 by a multiplier 30. The product formed by the multiplier 30 comprises sum and difference frequencies of the output signal Y(z) and the test signal having a frequency with an $n_2/n_1$ times higher frequency. The harmonic distortion in the output signal having a frequency which is $n_2/n_1$ times higher can be determined by measuring the difference in respect of a zero frequency at the output of the multiplier 30. The output signal V(z) is the harmonic distortion having a frequency which is $n2/n1$ times the frequency of the test signal T(z). A low-pass filter 31 filters this frequency from the signal of the multiplier 30. The cut-off frequency of the low-pass filter 31 determines the width of the filter in the spectrum of the seismic signal. As the cut-off frequency is selected lower, the contribution of the environmental noise as a consequence of the input acceleration will decrease.

Since the word length of the signals Y(z) and T(z) is small, the realization of the digital circuit will be simple.

What is claimed is:

1. A geophone system, comprising a plurality of geophones each consisting of a mechanical transducer and an electronic processing circuit, the mechanical transducer comprising an inertial mass and a force transducer, the inertial mass being adapted to be excited by an input acceleration signal and by the force transducer, the excitation being detected by a sensor element, said force transducer being controlled by the electronic processing circuit, the processing circuits of said geophones being connected with a central station by means of a transmission line element, characterized in that the sensor element detects the velocity of the inertial mass and controls an analog/digital converter by means of an amplifier with a very high gain factor, in that the output of the analog/digital converter is connected with the input of a digital/analog converter and in that the output of this digital/analog converter controls the force transducer.

2. The system of claim 1, wherein the input of the amplifier, apart from being connected with the sensor element, is connected with the output of a second digital/analog converter, in that the input of the second digital/analog converter is controlled by an inverter, and in that the inverter also controls an arithmetic unit, which, after a sample command from a clock, controls the first digital/analog converter, the arithmetic unit integrating the digital signal.

3. The system of claim 1 or 2 wherein a digital test signal T(z) is added in an adding stage to the output signal of the analog/digital converter, the output of this adding stage being connected with the first digital/analog converter, so as to exert a force in the inertial mass corresponding with this test signal and by means of the force transducer, the clock signal for the analog/digital converter also acting as the clock signal for the test signal.

4. The system of any one of claims 1 or 2, in which each mechanical transducer comprises a coaxial permanent magnetic assembly and a coaxial coil assembly comprising a sensing coil and a drive coil being arranged coaxially in a tubular outer pole shoe, one assembly being movable and the other one being stationary, springs being provided between both assemblies, wherein the magnet assembly consists of a permanent magnet which, at both sides, is provided with two inner pole shoes, the drive coil being arranged in the air-gap between the other inner pole shoe and the outer pole shoe, a compensation coil being arranged outside the magnetic field of the magnet and inside the outer pole shoe, all this in such a manner that the induction voltage induced as a consequence of the alternating flux produced by the drive coil in the compensation is substantially equal to the induction voltage induced as a consequence of the alternating flux in the sensing coil.

5. A transducer for detecting mechanical vibrations, in which each mechanical transducer comprises a coaxial permanent magnet assembly and a coaxial coil assembly comprising a sensing coil and a drive coil which are arranged coaxially in a tubular outer pole shoe, one assembly being movable and the other one being stationary, springs being provided between both assemblies, characterized in that the permanent magnet assembly consists of a permanent magnet which, at both sides, is provided with two inner pole shoes, the drive coil being arranged in the air-gap between one of the inner pole shoes and the outer pole shoe, and the sensing coil being provided in the air-gap between the other inner pole shoe and the outer pole shoe, a compensation coil being arranged outside the magnetic field of the magnet and inside the outer pole shoe, all this in such a manner that the induction voltage induced as a consequence of the alternating flux produced by the drive coil in the compensation coil is substantially equal to the induction voltage induced as a consequence of the alternating flux in the sensing coil.

6. The system of claim 4, wherein the magnetic assembly comprises a third inner pole shoe in front of the compensation coil, and is separated from the first inner pole shoe by a non-magnetic interspace.

7. The system of claim 4, wherein the inner pole shoes are interconnected by means of an electrically conducting core directed in the axial direction of the assembly.

8. A method for testing a geophone system of claims 1 or 2, wherein a digital test signal is produced by reading a signal stored in a memory for controlling the geophone, a second test signal is produced by reading said memory with an n-times higher velocity, a digital multiplier multiplies the second test signal with the output signal, the low-pass filter filtering the n-th harmonic distortion from the output signal of the multiplier.

9. The system of claim 6, wherein the inner pole shoes are connected by means of an electrically conducting core directed in the axial assembly.

10. A method for testing the geophone system of claim 3, wherein a digital test signal is produced by reading a signal stored in a memory for controlling the geophone, a second test signal being produced by reading said memory with an n-times higher velocity, a digital multiplier multiples the said second test signal with the output signal, the low pass filter filtering the n-th harmonic distortion from the output signal of the multiplier.

11. The system of claim 4, wherein the outer pole shoe is mechanically rigidly connected with the inner pole shoe by means of two spokes.

12. The system of claim 1, wherein the amplifier has a low-pass characteristic, and in that input thereof, apart from being connected with the velocity sensor element, is connected with the output of the digital/analog converter, in order to limit the control of the digital/analog converter as a consequence of the offset of the amplifier, and to suppress the quantization noise.

* * * * *

UNITED STATES PATENT AND TRADEMARK OFFICE
CERTIFICATE OF CORRECTION

PATENT NO. : 5,172,345

DATED : 15 December 1992

INVENTOR(S) : Jacobus W. P. VAN DER POEL

It is certified that error appears in the above-indentified patent and that said Letters Patent is hereby corrected as shown below:

| Column | Line  | |
|--------|-------|---|
| 1      | 20    | Change "disturb-" to -- distur- --. |
| 1      | 21    | Change "ances" to --bances--. |
| 1      | 68    | After "is to" insert --be--. |
| 2      | 2     | Change "therefor" to --therefore--; after "Moreover" insert --,--. |
| 2      | 25    | After "counter" insert --,--. |
| 2      | 28    | After "In fact" insert --,--. |
| 3      | 62    | After "measurement" insert --,--. |
| 4      | 13    | Change "Y(z)/X(z)" to --Y(s)/X(s)--. |
| 4      | 43    | After "inverter 9" insert --,--. |
| 4      | 53    | Change "feed-back" to --feedback--. |
| 4      | 59-60 | Change "difficulty realized" to --realized with difficulty--. |

UNITED STATES PATENT AND TRADEMARK OFFICE
CERTIFICATE OF CORRECTION

PATENT NO. : 5,172,345

DATED : 15 December 1992

INVENTOR(S) : Jacobus W. P. VAN DER POEL

It is certified that error appears in the above-indentified patent and that said Letters Patent is hereby corrected as shown below:

| Column | Line | |
|---|---|---|
| 4 | 61 | Change "feed-back" to --feedback--. |
| 4 | 64 | Change "can, now," to --can now--. |
| 4 | 66 | After "moreover" insert --,--. |
| 5 | 14 | Change "chosing" to --choosing--. |
| 5 | 55 | Change "feed-back" to --feedback--. |
| 6 | 11 | Change "and, then," to --and then--. |
| 6 | 32 | After "i.e." insert --,--. |
| 6 | 39 | After "this" insert --,--. |
| 7 | 26 | Change "n2/n1" to --$n_2/n_1$--. |
| 9 | 2 | Change "low pass" to --low-pass--. |

Signed and Sealed this

Twenty-fifth Day of January, 1994

Attest:

BRUCE LEHMAN

Attesting Officer     Commissioner of Patents and Trademarks